(12) United States Patent
Vogt Saladucha

(10) Patent No.: US 7,127,827 B2
(45) Date of Patent: Oct. 31, 2006

(54) ANATOMICAL MEASURING DISPLAY APPARATUS

(76) Inventor: Katie Vogt Saladucha, 437 Upper Blvd., Ridgewood, NJ (US) 07450

( * ) Notice: Subject to any disclaimer, the term of this patent is extended or adjusted under 35 U.S.C. 154(b) by 0 days.

(21) Appl. No.: 10/964,478

(22) Filed: Oct. 13, 2004

(65) Prior Publication Data

US 2006/0075652 A1    Apr. 13, 2006

(51) Int. Cl.
*G01B 3/10* (2006.01)
(52) U.S. Cl. .......................... 33/759; 33/512
(58) Field of Classification Search ............ 33/759, 33/763–765, 512
See application file for complete search history.

(56) References Cited

U.S. PATENT DOCUMENTS

| 3,834,029 A * | 9/1974 | Stiebel ........................ 33/3 C |
| 4,195,348 A * | 3/1980 | Kakutani .................... 702/164 |
| 5,414,943 A * | 5/1995 | Vogt ............................ 33/764 |
| 5,619,804 A * | 4/1997 | Vogt et al. .................... 33/763 |
| 6,467,180 B1* | 10/2002 | Chan ............................ 33/512 |
| 6,640,460 B1* | 11/2003 | Nabarro et al. ............... 33/759 |

OTHER PUBLICATIONS

International Search Report dated Dec. 28, 2005; corresponding international patent application PCT/US05/35703; filed Oct. 3, 2005.
PCT Written Opinion dated Dec. 28, 2005; corresponding International patent application PCT/US05/35703; filed Oct. 3, 2005.

\* cited by examiner

*Primary Examiner*—Christopher W. Fulton
(74) *Attorney, Agent, or Firm*—Gottlieb, Rackman & Reisman, P.C.

(57) ABSTRACT

A method and apparatus is disclosed for calculating cup and band size for a brassiere comprising the steps of obtaining an under-the-bust measurement indicative of band size and a bust measurement indicative of cup size. If the under-the-bust measurement is even, then the apparatus increases the band size by a first selected amount and decreases the cup size by a second selected amount. The resulting measurements are selectively displayed on a screen according to sizing standards in the U.S. or according to sizing standards in other countries.

21 Claims, 7 Drawing Sheets

FIGURE 1

(Prior Art)

FIGURE 2

CONVERSIONS BETWEEN CUP INTEGER AND CUP SIZE

If X < 1 = AA
If X = 1 = A
If X = 2 = B
If X = 3 = C
If X = 4 = D
If X = 5 = DD
If X = 6 = DDD
If X > 6 = E

INTERNATIONAL BRA SIZING CHART

FOR BAND SIZES:

| U.S.A. | Europe | France/Spain | U.K. | Italy |
|--------|--------|--------------|------|-------|
| 30 | 65 | 80 | 30 | 1 |
| 32 | 70 | 85 | 32 | 2 |
| 34 | 75 | 90 | 34 | 3 |
| 36 | 80 | 95 | 36 | 4 |
| 38 | 85 | 100 | 38 | 5 |
| 40 | 90 | 105 | 40 | 6 |
| 42 | 95 | 110 | 42 | 7 |
| 44 | 100 | 115 | 44 | 8 |
| 46 | 105 | 120 | 44 | |
| 48 | 110 | 125 | 48 | |

FIGURE 5

CONVERSIONS BETWEEN CUP INTEGER AND CUP SIZE IN THE U.K.

ANATOMICAL MEASURING DISPLAY APPARATUS

RELATED APPLICATIONS

None

FIELD OF THE INVENTION

The invention relates to a method and apparatus for measuring a brassiere size and more particularly to a method and apparatus in which the cup and band size of the brassiere are automatically adjusted to provide a more comfortable fit to a woman.

BACKGROUND OF THE INVENTION

Various methods and devices have been used to assist women in easily determining their brassiere size. Two examples are U.S. Pat. Nos. 5,414,943 and 5,619,804, a continuation in part of the '943 patent, both to the present inventor and both teaching an "Anatomical Measuring Tape with Indicator."

The '943 patent discloses a device comprising a housing having first and second compartments, containing first and second lockable winding mechanisms, respectively. The first tape indicates band size and the second tape indicates cup size. Each tape has a free end that can extend outward of the compartment and each compartment has two windows for displaying the readout of the respective tape.

In use, the free end of the tape for measuring the band size is extended outwardly about the torso of a woman to measure the circumference or girth of the torso. When the free end of the first tape meets the free end of the second tape, the first winding mechanism is locked. At this point, the band size is displayed in the first window. The woman then places the tape about her bust, where the girth of the bust causes the free end of the first tape to separate from the free end of the second tape. The free end of the second tape is then extended outwardly to meet the free end of the first tape. When the two ends again have met, the second mechanism is locked. At this point, the cup size is displayed in the second window.

The '804 patent differs from the '943 patent by disclosing that the first tape is calibrated to add "5" inches to the ribcage reading (R1+5) based upon measurement techniques that are customary in the United States. The second tape is calibrated to the bust size minus the ribcage measurement (R2−(R1+5)).

In the '804 patent, a single tape is used with means for electronically measuring the bust size. The electronic means calculates a scaled offset so that when the tape is extended around a ribcage, the measurement R1 is augmented by five (5), a constant that is customary in the United States. A button is pushed on the device which enables the woman to extend the tape for reading the cup size of the bust. The cup size is based upon the difference of the girth readings, or R2−(R1+5). A well known conversion translates the reading into a cup size according to standards in the United States.

The prior art has a shortcoming in how it handles sizing where the measurement under the bust is represented by an even number. It has been determined that the customary calculations for brassieres, in these instances, produce an uncomfortable fit.

The prior art also has a shortcoming in that it calculates band and cup sizes as calibrated in a single apparatus, such as the apparatus adopted in the United States. In contrast, Europe and Italy each have parameters for measuring band sizes that differ from that adopted in the United States. The U.K. has parameters for measuring cup sizes that also differ from that adopted in the United States. A person traveling in different countries would be required to purchase separately calibrated devices for each country. Accordingly, there is a need for a apparatus and method for calculating brassiere sizes that can calculate band and cup sizes for any country having a known measurement scheme.

SUMMARY OF THE INVENTION

A method and apparatus is disclosed for calculating cup and band sizes for a brassiere comprising the steps of obtaining an under-the-bust measurement indicative of band size and a bust measurement indicative of cup size. If the under-the-bust measurement is even, then the apparatus increases the band size by a first selected amount and decreases the cup size by a second selected amount.

BRIEF DESCRIPTION OF THE FIGURES

To further satisfy the recited objectives, a detailed description of typical embodiments of the invention is provided with reference to appended drawings that are not intended to limit the scope of the invention, in which.

DESCRIPTION OF THE EMBODIMENTS

Figure 1:
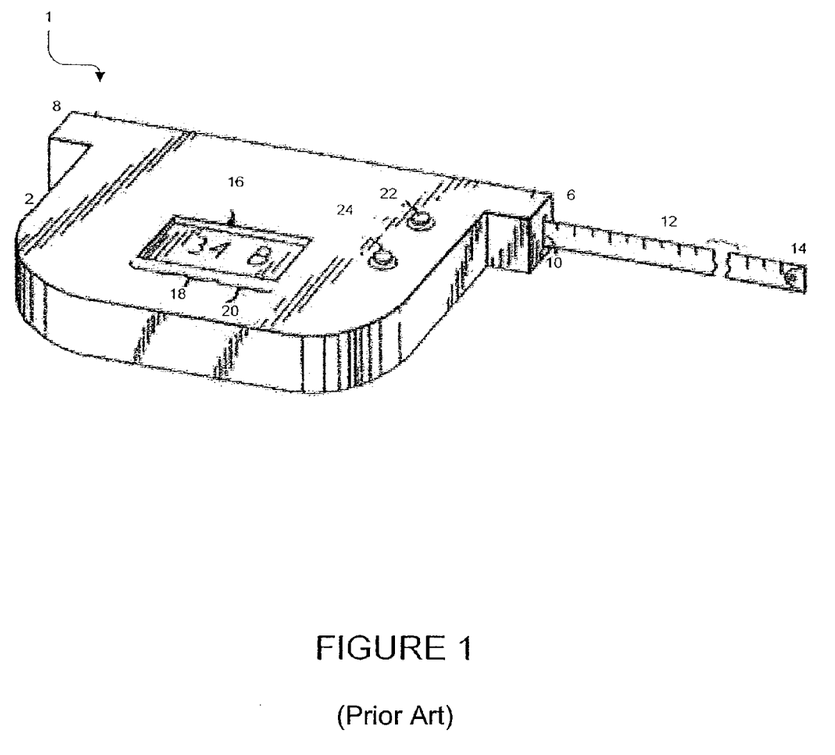
FIG. 1 is an illustration of the measuring device according to the invention.

Turning to FIG. 1, a measuring device 1 is shown. The device consists of a housing 2 having a top surface 4 and two opposing lateral extensions 6 and 8. The lateral extension 6 includes a slot 10 through which a measuring tape 12 is paid out. The tape 12 has a free end 14 and the lateral extension 8 includes a latch (not shown) for securing the free end 14. The top surface 4 includes an electronic display 16 with first and second display zones 18 and 20. In addition, mounted on the top surface 14 are two push-button switches 22 and 24. Optionally, a power switch (not shown) may be provided on the housing for selectively turning the apparatus 1 on and off.

Figure 2:
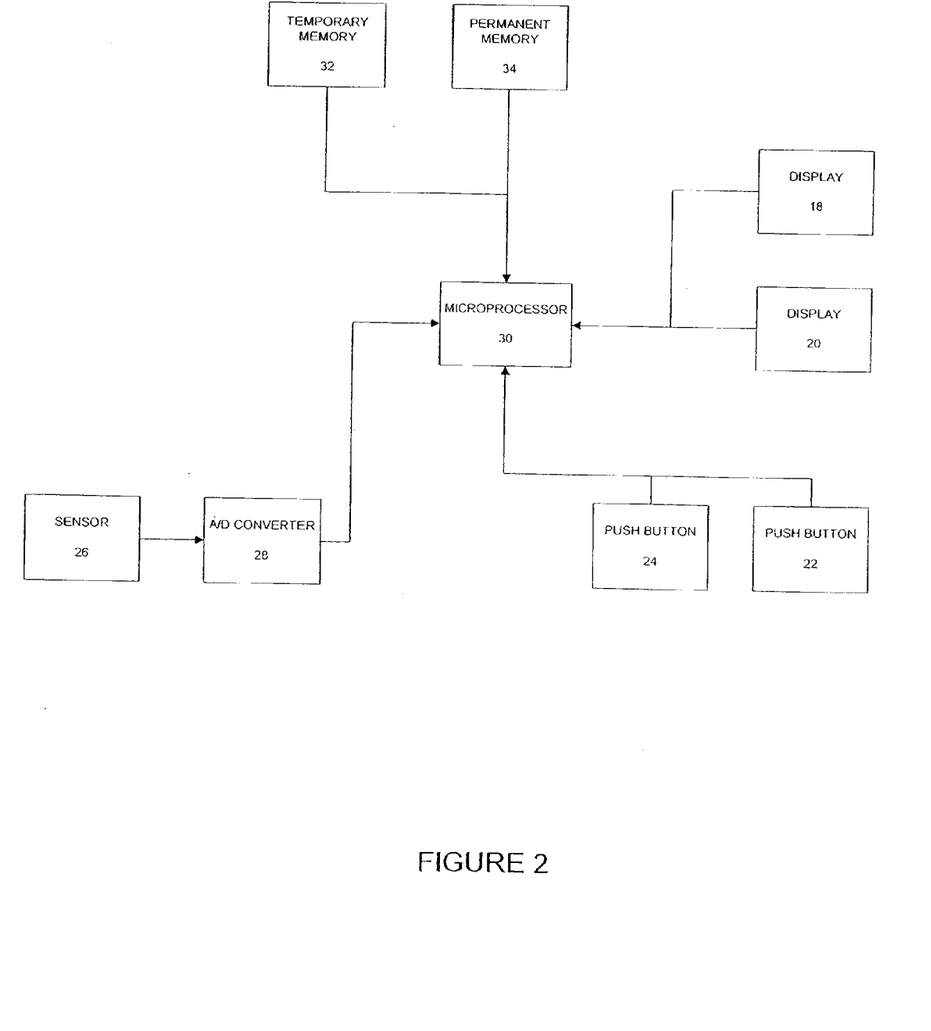
FIG. 2 is a block diagram of the device of FIG. 1.

Referring now to FIG. 2, the electronic components of the measuring device includes a sensor 26 for sensing the extension of the tape 12. The sensor 26 can be a electromechanical gauge that produces a change in voltage as the tape measure is extended from the device. An analog to digital (A/D) converter 28 converts the signal from the sensor into a digital signal for processing by a microprocessor 30. The microprocessor 30 has temporary memory 32 for temporarily storing measurement data and permanent memory 34 for storing formulas and tables required to convert raw measurement data into brassiere cup and band sizes. Each display 18 and 20 and each push button 22 and 24 are also in communication with the microprocessor 30 and operate as described below.

Mathematical formulae and processes performed by the device 1 for translating measured data into a brassiere size are as follows:

$F1: M1'=M1+¼; I1=\lfloor M1' \rfloor;$ $F2:$ If $I1$ is even, $B=I1+4;$ if $I1$ is odd, $B=I1+5;$ $F3: I2=\lfloor M2 \rfloor; X=I2-B;$ $F4:$ If $I1$ is odd, $X$ is applied against a lookup table to determine the cup size and $B$ is the band size; otherwise $B'=B+2, X'=X-1, X'$ is applied against the lookup table to determine the cup size and $B'$ is the band size.

The under-the-bust measurement, M1, is applied in the first formula, F1, where M1 is a real number measured in a two step process. The first step requires wrapping the free end 14 of the tape 12 around the torso of a woman, under her bust, until the free end 14 reaches the lateral extension 8 of the housing 2. The second step augments the measurement by the distance between extensions 6 and 8. A modified under-the-bust measurement, M1', is determined by augmenting M1 by one quarter of an inch (¼") to provide a small gap between the brassiere band and the skin of a woman. The under-the-bust integer, I1, is the integer component (or value) of M1' and can be an odd or an even number.

The band integer, B, is defined in the second formula, F2, where B is a function of whether I1 is an odd or even number. If I1 is an odd number, then B is I1 augmented by five (5), and if I1 is an even number, then B is I1 augmented by four (4). These operations assure that B always is an even number.

The bust measurement, M2, is applied in the third formula, F3, where M2 represents the distance around the bust of a woman. The measurement of M2 is determined similarly to the two step process performed in determining the under-the-bust measurement, M1. The bust integer, I2 is the integer component of M2. The cup integer X is determined by subtracting B from I2. It is to be appreciated that although B can only be an even number, if M2 is an odd number, then I2 and X will be odd numbers as well.

Figure 3:
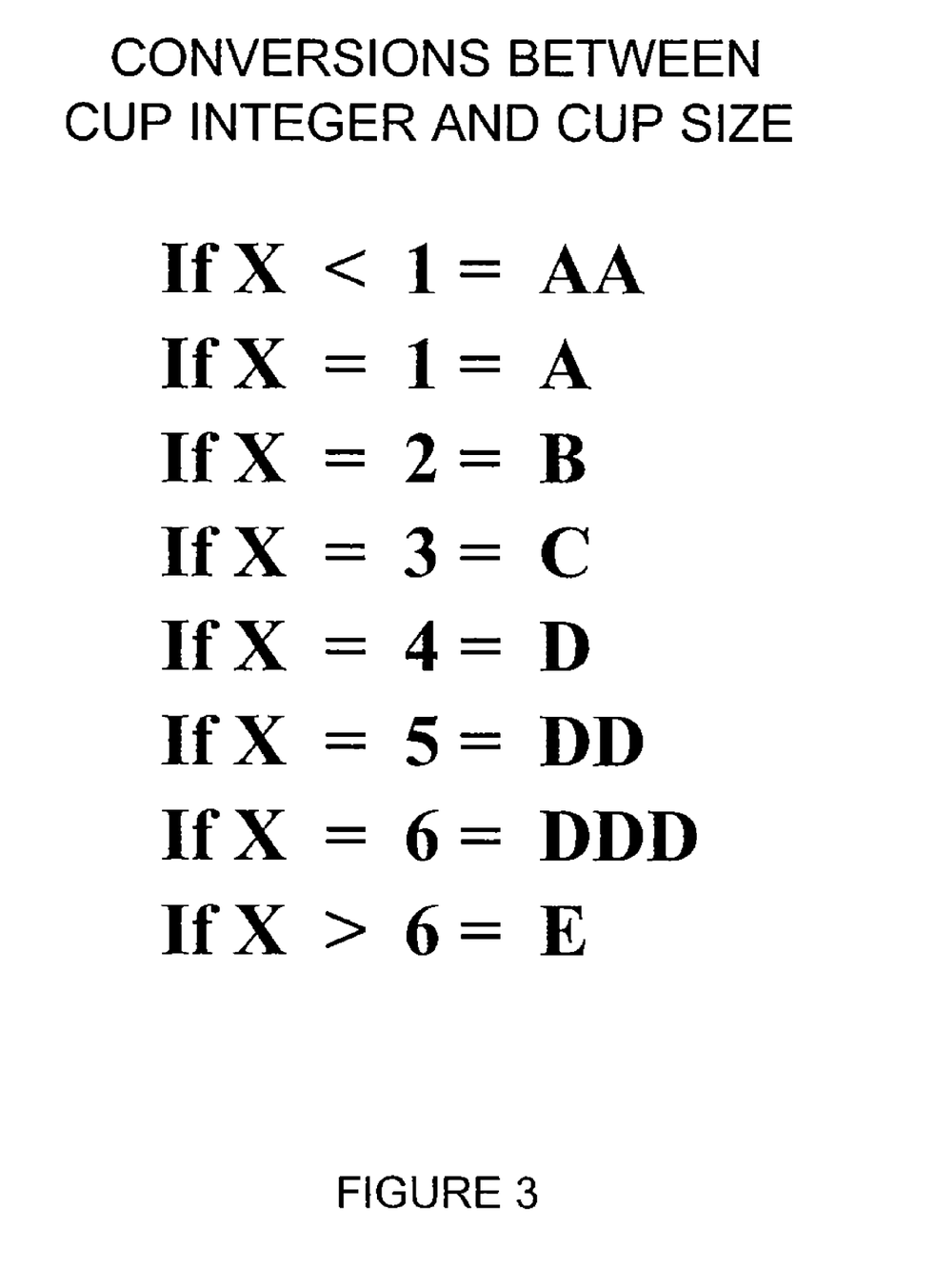
FIG. 3 is a table of cup sizes.

The cup and band sizes are found according to the process of the fourth formula, F4, and utilizing a lookup table illustrated in FIG. 3. As with B, the process for determining the cup size and band size are dependent on whether I1 is odd or even. If I1 is odd, the cup size is found by comparing X against the values stored in the lookup table and B is the band size. For example, where B is 34, and X is 3, the brassiere size is a 34C.

If I1 is an even number, then a modified cup integer, X', is calculated by reducing X by one (1), and a modified bust integer B' is calculated by augmenting B by two (2). The cup size is found by comparing X' against the values stored in the lookup table and B' is the band size. For example, where B is 34 and X is 4, then the brassiere size is 36C. The band size is increased and the cup size is decreases because it has been found that this modification to the brassiere size is more comfortable to a woman having a torso with an even measurement.

Figure 4:
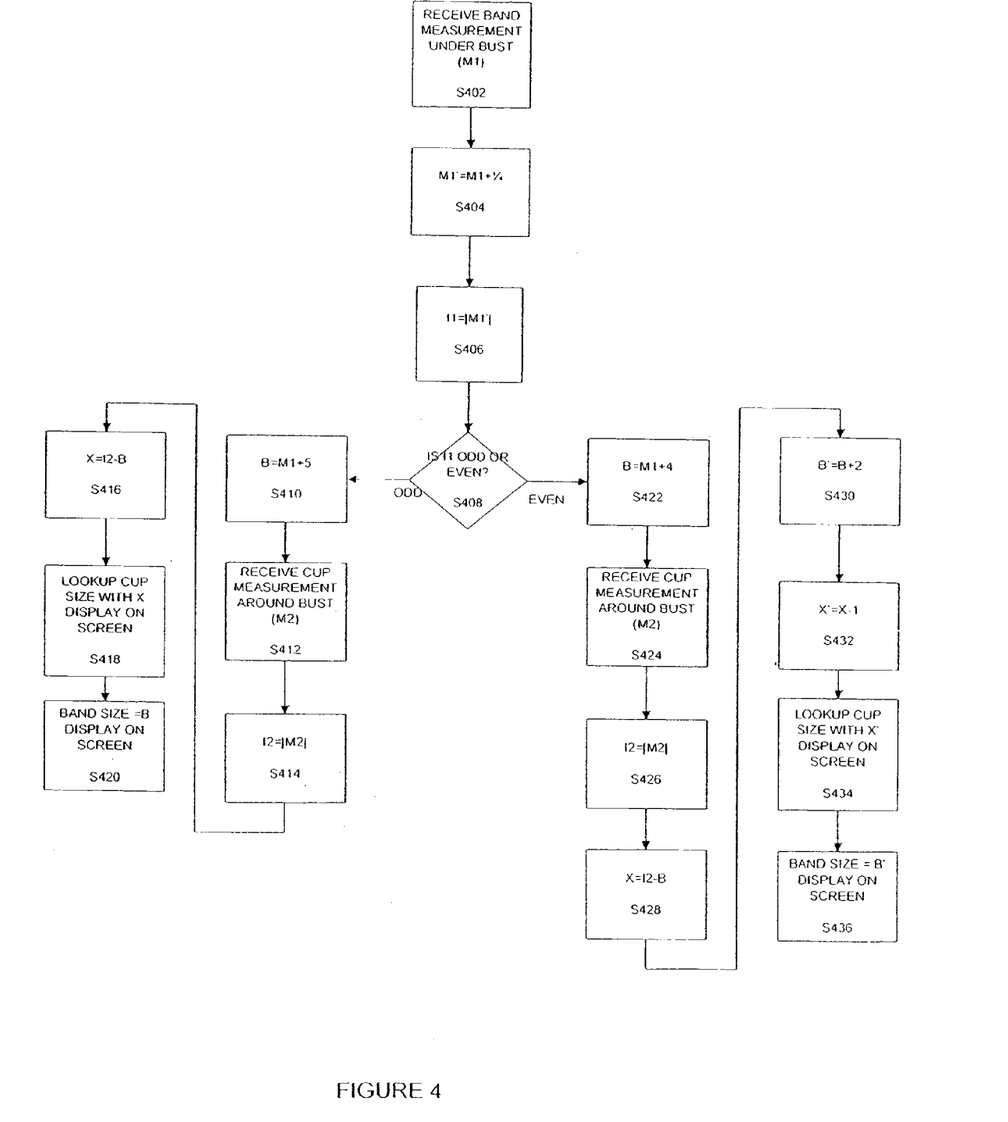
FIG. 4 is a flowchart illustrating the method of performing the invention.

The method of the invention is disclosed in FIG. 4, where the under-the-bust measurement M1 is taken by wrapping the free end 14 of the tape 12 around the torso of the woman in step S402. The modified under-the-bust measurement M1', providing by increasing the value of M1 by one quarter of an inch, is calculated by the microprocessor in step S404. The under-the-bust integer I1 is calculated in step S406 by truncating any non-integer component from M1'.

The determination is made by the microprocessor of whether I1 is odd or even in step S408. If I1 is odd, the band integer B is calculated in step S410 by augmenting I1 by five (5). The bust measurement is taken at step S412 by wrapping the free end 14 of the tape 12 around the bust of a woman. The bust integer I2 is defined in step S424 as the integer component of the bust measurement M2, and the cup integer X is calculated in step S416 by subtracting B from I2. The cup size is obtained in step S418 by comparing I2 with the values in the lookup table of FIG. 3, and the value is illustrated on the display 18. The band size is identified in step S420 as B and illustrated on the display 20.

If I1 is even at step S408, then steps S422 through S428 (which are identical to steps S410 through S416) are followed to determine the band integer B and cup integer X. In step S430, a modified band integer B' is defined by augmenting B by two (2), and a modified cup integer X' is determined by decrementing X by one (1). The cup size is obtained from the lookup table by comparing X' to the stored values and illustrating the result on displayed 18 in step S434. The band size is identified as B' and illustrated on the screen 20 in step S436. Accordingly, a more comfortable fit to women having a torso with an even measurement is provided. In an alternate emobidment, both sets of measurments (e.g., B-X and B'-X) are displayed.

Figure 5:
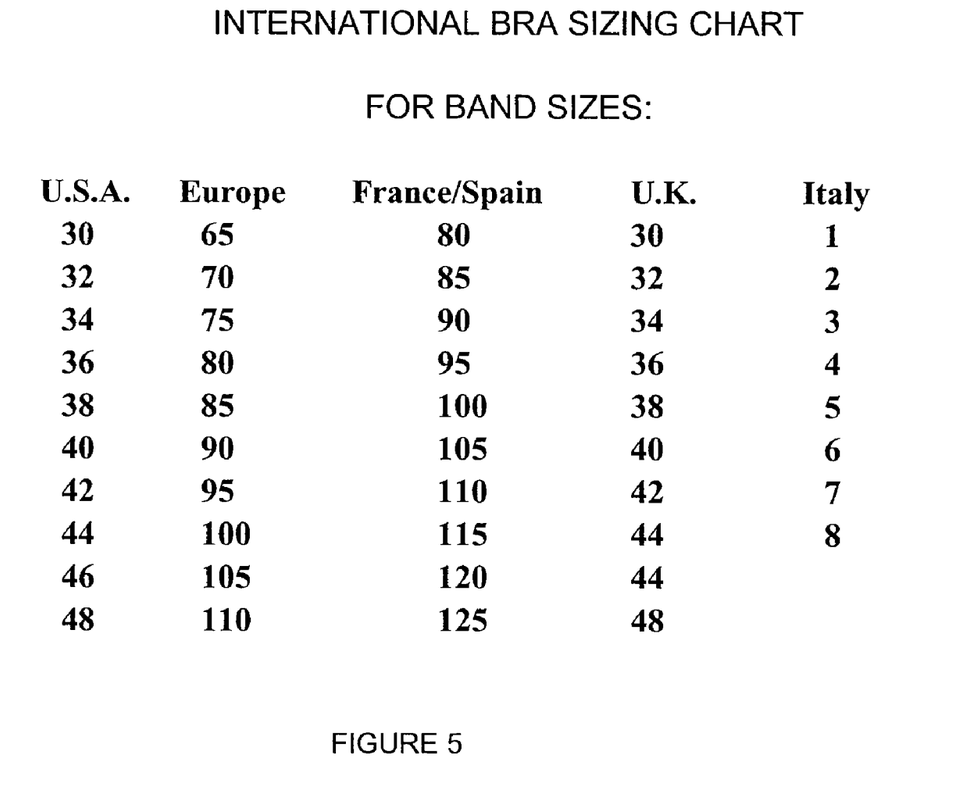
FIG. 5 is a chart comparing band sizes in various countries.
Figure 6:
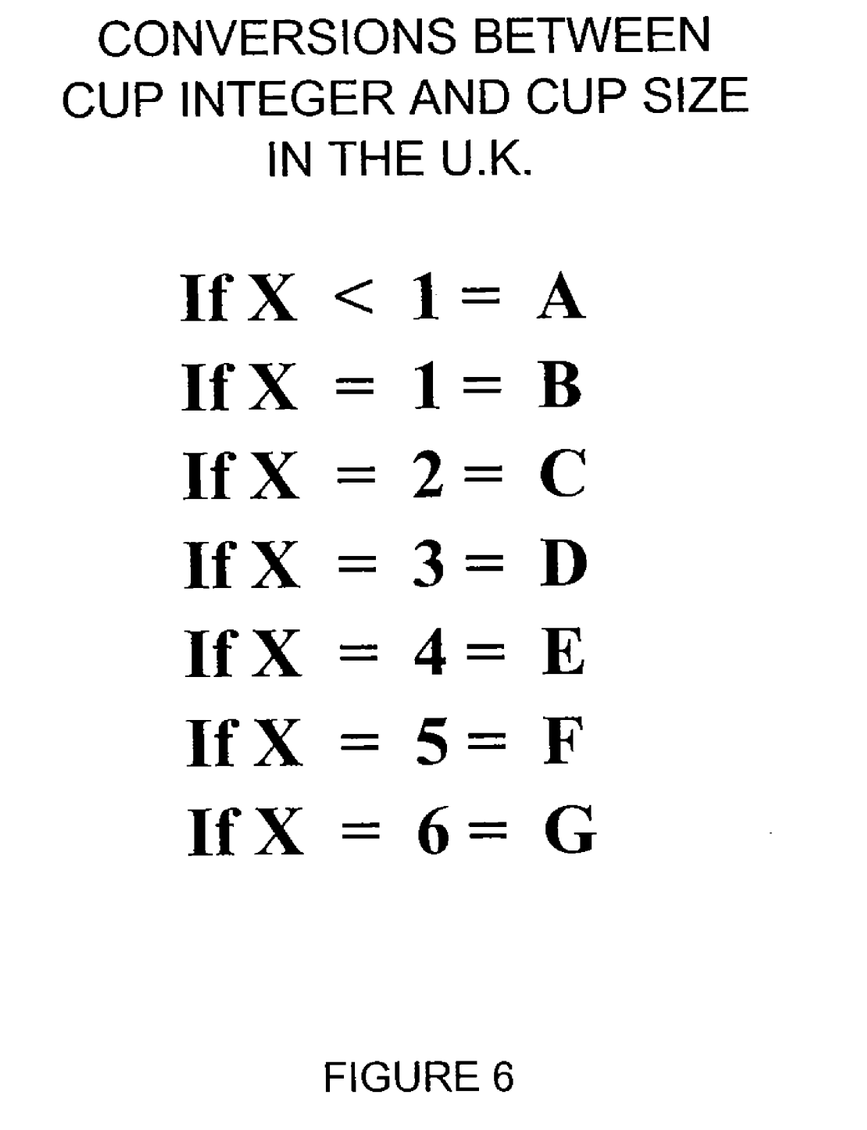
FIG. 6 is a table of cup sizes in the U.K.

In the above embodiment, the brassiere size provided by the device 1 correlates to a sizing standard adopted in the United States. In an alternative embodiment, the device 1 is capable of determining brassiere sizes in countries having different sizing standards, such as illustrated in FIGS. 5 and 6. For example, under United States sizing standards, band measurements range from 30 through 48 and are incremented by 2. In contrast, band measurements in some parts of Europe range from 65 through 110, incremented by 5, while band measurements in France and Spain range from 80 to 125, incremented by 5. Furthermore, band measurements in Italy range from 1 through 8, incremented by 1. Cup sizes in Italy are based on an A through G scale that differs from that in the A through E scale in the United States.

Figure 7:
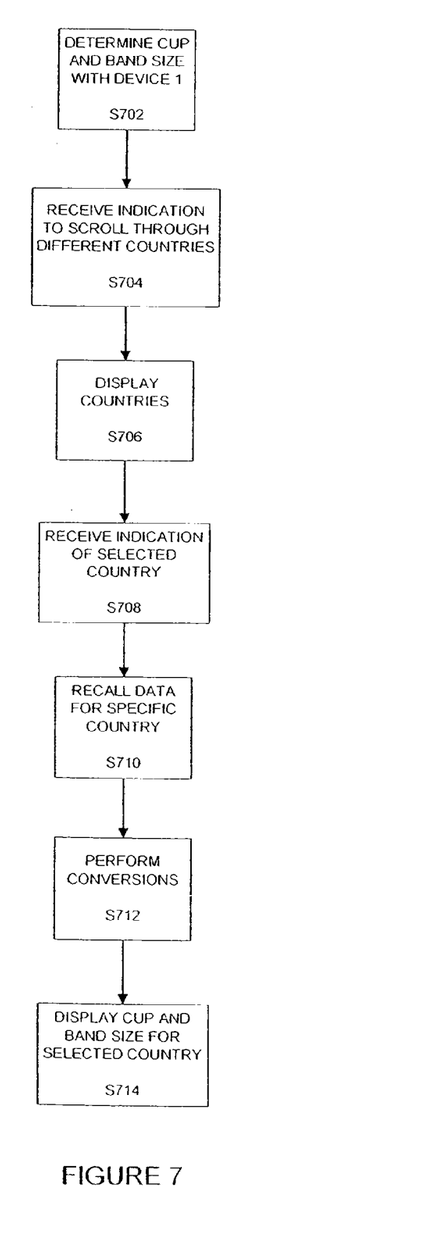
FIG. 7 is a flowchart illustrating a method of determining brassiere sizes in various countries.

Turning to FIG. 7, a flowchart illustrates the method of second embodiment, where the band and cup sizes are first determined as indicated in steps S402-S436 at step S702. The device receives at step S704 an indication from the user, via the push button 22, that the measured band and cup sizes should be converted to a sizing standard found in a different country, such as France, Spain, Italy, etc. The memory contains the name of each country for which conversions are stored, and the names are scrolled over the display 18 with each successive depression of the button 22. The device then receives at step S708, via a depression of the button 24, a selection of the specific country for which the sizes are to be converted.

Once the country is selected, conversion data for the differing sizing standard is recalled at step S710 from temporary memory 32 if, for example, the device has already calculated the data. Otherwise, data is recalled from permanent memory 34. Then, the microprocessor 30 performs sizing conversions to conform the sizing to the chosen standard at step S704, and the results are displayed on displays 18 and 20 at step S714.

Figure 8:
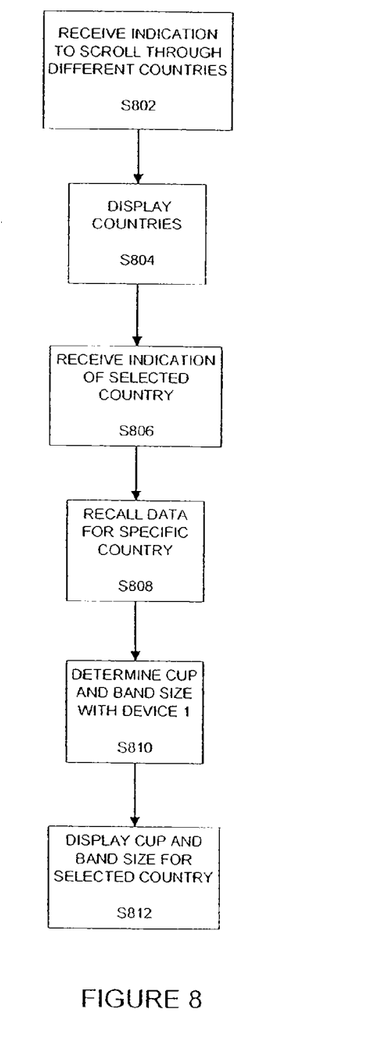
FIG. 8 is a flowchart illustrating a second method of determining brassiere sizes in various countries.

Turning to FIG. 8, in another alternative embodiment, the country is selected at steps S802–S808, which are identical to steps S704–710. After the data for the selected country is loaded into memory 32, the measurements are taken in step S810, which follows the same routine as steps S402–S436 and calculates the correct band and cup size directly from the respective measurments (e.g., without calculating the measurements according to U.S. sizing standards). The results are displayed at step S812. The benefit of this embodiment over the embodiment of FIG. 7 is there is no need to convert data from one sizing scheme to another.

Accordingly, the microprocessor 30 is capable of calculating the band and cup sizes for the United States as well as regions having differing sizing standards, and the user is able to obtain band and cup sizes for the differing regions without purchasing different devices.

The present invention may be embodied in other specific forms without departing from its spirit or essential characteristics. The described embodiments are to be considered in all respects only as illustrative and not as restrictive. The scope of the invention is, therefore, indicated by the appended claims and their combination in whole or in part rather than by the foregoing description. All changes that come within the meaning and range of equivalency of the claims are to be embraced within their scope.

What is claimed is:

1. A method for calculating cup and band size for a brassiere comprising the steps of:
   obtaining an under-the-bust measurement M1 and a bust measurement M2;
   determining an under-the-bust integer I1 based on the integer component of the under-the-bust measurement M1;
   if said under-the-bust integer I1 is odd, then augmenting said under-the-bust-integer I1 by an odd number, otherwise augmenting the under-the-bust integer I1 by an even number to obtain a band integer B;
   if said under-the-bust integer I1 is an odd number, then the band size is said band integer B, otherwise the band size is the band integer B augmented by a first selected amount;
   generating a cup integer I2 from said bust measurement M2;
   generating a parameter X from said cup integer I2 and said band integer B; and
   using said parameter X to determine the cup size;
   if said under-the-bust integer I1 is even, decreasing the parameter X by a second selected amount; and
   using said decreased parameter X to determine the cup size.

2. The method of claim 1 wherein the apparatus has a screen, and the method comprises displaying the cup and band size on a screen.

3. The method of claim 1 further comprising augmenting said under-the-bust measurement M1 before determining said under-the-bust integer I1.

4. The method of claim 3 wherein said bust measurement is augmented by ¼".

5. An apparatus for calculating cup and band size for a brassiere, the apparatus comprising means for measuring girth, means for processing cup and band size, means for inputting data into the processing means and means for displaying information, where the apparatus:
   obtains an under-the-bust measurement indicative of a standard band size and a bust measurement indicative of a standard cup size, and if the under-the-bust measurement is even, then the apparatus:
   increases the band size by a first selected amount; and
   decreases the cup size by a second selected amount.

6. The apparatus of claim 5 wherein the apparatus:
   determines an under-the-bust integer by truncating the non-integer component from the under-the-bust measurement, determines a band integer by augmenting an even under-the-bust integer by an even number or augmenting an odd under-the-bust integer by an odd number;
   wherein:
   if said band integer is an odd number, then the band size is the band integer, otherwise the band size is the band integer increased by said first selected amount.

7. The apparatus of claim 6 wherein the apparatus:
   determines a bust integer by truncating the non-integer component from the bust measurement, determines a cup integer by subtracting said band integer from said bust integer;
   if said band integer is an odd number, then the cup size is determined by comparing the cup integer to values stored in a lookup table, otherwise (i) the cup integer is reduced by said second amount, and (ii) the apparatus determines the cup size by comparing the reduced cup integer to values stored in the lookup table.

8. The apparatus of claim 7 wherein the apparatus has a screen and displays the cup and band size on said screen.

9. The apparatus of claim 5 wherein said bust size is increased by one size and said cup size is decreased by one size.

10. A method for calculating cup and band size for a brassiere comprising the steps of:
    displaying at least one indicator of a country;
    receiving an input indicative of a selected country
    obtaining bust and cup measurements that conform to standards in said selected country;
    obtaining an under-the-bust measurement indicative of a standard band size and a bust measurement indicative of a standard cup size;
    and if the under-the-bust measurement is even, then:
    increasing the standard band size to a larger band size;
    decreasing the cup size to a smaller cup size; and
    displaying the bust and cup measurements.

11. The method of claim 10 wherein the method further comprises:
    determining an under-the-bust integer by truncating the non-integer component from the under-the-bust measurement, determining a standard band integer by augmenting an even under-the-bust integer by an even number or augmenting an odd under-the-bust integer by an odd number; wherein:
    if said band integer is an odd number, then the band size is the band integer, otherwise the band size is the band integer augmented by a first selected amount.

12. The method of claim 11 wherein the method further comprises:
    determining a bust integer by truncating the non-integer component from the bust measurement, determining a standard cup integer by subtracting said standard band integer from said bust integer, wherein:
    if said band integer is an odd number, then the cup size is determined by comparing the standard cup integer to values stored in a lookup table, otherwise (i) the standard cup integer is reduced by a second amount, and (ii) the standard cup size is determined by comparing the reduced cup integer to values stored in the lookup table.

13. An apparatus for calculating cup and band size for a brassiere, the apparatus comprising means for measuring girth, means for processing cup and band size, means for inputting data into the processing means and means for displaying information, where the apparatus:

obtains an under-the-bust measurement indicative of band size and a bust measurement indicative of cup size;

determining a standard band size and a standard cup size from saud under-the-bust and said must measurements and if the under-the-bust measurement is even, then:

increases the standard band size to a larger band size;

decreases the standard cup size to a smaller cup size;

displays at least one indicator of a country;

receives an input indicative of a selected country;

obtains first bust and cup measurements using standards from a different country;

conforms the first bust and cup measurements to standards in said selected country; and displays the conformed bust and cup measurements.

14. The apparatus of claim 13 wherein the apparatus:

determines an under-the-bust integer by truncating a non-integer component from the under-the-bust measurement, determines a band integer by augmenting an even under-the-bust integer by an even number or augmenting an odd under-the-bust integer by an odd number; wherein:

if said band integer is an odd number, then the standard band size is the band integer, otherwise the band size is the band integer increased by a first selected amount.

15. The apparatus of claim 14 wherein the apparatus:

determines a bust integer by truncating a non-integer component from the bust measurement, determines a cup integer by subtracting said band integer from said bust integer; and if said band integer is an odd number, then the standard cup size is determined by comparing the cup integer to values stored in a lookup table, otherwise (i) the cup integer is reduced by a second amount, and (ii) the apparatus determines the cup size by comparing the reduced cup integer to values stored in the lookup table.

16. A method for calculating cup and band size for a brassiere comprising the steps of:

obtaining bust and cup measurements that conform to sizing standards in a first country, including;

obtaining an under-the-bust measurement indicative of band size and a bust measurement indicative of cup size, and if the under-the-bust measurement is even, then:

increasing the band size to a higher band size; and decreasing the cup size to a lower cup size;

displaying at least one indicator of a second country;

receiving an input indicative of selecting said second country;

conforming said bust and cup measurements to sizing standards in said second country; and displaying the bust and cup measurements.

17. The method of claim 16 wherein the method further comprises:

determining an under-the-bust integer by truncating the non-integer component from the under-the-bust measurement, determining a band integer by augmenting an even under-the-bust integer by an even number or augmenting an odd under-the-bust integer by an odd number wherein:

if said band integer is an odd number, then the band size is the band integer, otherwise the band size is the band integer augmented by a first integer.

18. The method of claim 17 wherein the method further comprises:

determining a bust integer by truncating the non-integer component from the bust measurement, determining a cup integer by subtracting said band integer from said bust integer, wherein:

if said band integer is an odd number, then the cup size is determined by comparing the cup integer to values stored in a lookup table, otherwise (i) the cup integer is reduced by a second integer, and (ii) the cup size is determined by comparing the reduced cup integer to values stored in the lookup table.

19. An apparatus for calculating cup and band size for a brassiere, the apparatus comprising means for measuring girth, means for processing cup and band size, means for inputting data into the processing means and means for displaying information, where the apparatus:

obtains an under-the-bust measurement indicative of band size and a bust measurement indicative of cup size, and if the under-the-bust measurement is even, then;

increases the band size to a larger band size to obtain a bust measurement;

decreases the cup size to a smaller cup size to obtain a cup measurement;

displays at least one indicator of a second country;

receives an input indicative of selecting said second country;

transforms said bust and cup measurements to sizing standards in said selected country; and displays the conformed bust and cup measurements.

20. The apparatus of claim 19 wherein the apparatus:

determines an under-the-bust integer by truncating the non-integer component from the under-the-bust measurement, determines a band integer by augmenting an even under-the-bust integer by an even number or augmenting an odd under-the-bust integer by an odd number; wherein:

if said band integer is an odd number, then the band size is the band integer, otherwise the band size is the band integer increased by said first selected amount.

21. The apparatus of claim 20 wherein the apparatus:

determines a bust integer by truncating the non-integer component from the bust measurement, determines a cup integer by subtracting said band integer from said bust integer; and if said band integer is an odd number, then the cup size is determined by comparing the cup integer to values stored in a lookup table, otherwise (i) the cup integer is reduced by said second amount, and (ii) the apparatus determines the cup size by comparing the reduced cup integer to values stored in the lookup table.

* * * * *